United States Patent [19]

Ohno et al.

[11] Patent Number: 4,533,402
[45] Date of Patent: Aug. 6, 1985

[54] METHOD OF MANUFACTURING A HOLLOW STABILIZER

[75] Inventors: Akira Ohno; Hiroshi Koyama, both of Yokohama; Kanji Inoue, Kamakura; Hiroaki Ozawa, Yokohama, all of Japan

[73] Assignee: NHK Spring Co., Ltd., Yokohama, Japan

[21] Appl. No.: 580,858

[22] Filed: Feb. 16, 1984

[51] Int. Cl.$^3$ .............................................. C21D 9/08
[52] U.S. Cl. .................... 148/12.4; 148/12 B
[58] Field of Search ........................... 148/12 B, 12.4

[56] References Cited

U.S. PATENT DOCUMENTS

| | | | |
|---|---|---|---|
| 4,138,141 | 2/1979 | Andersen | 403/206 |
| 4,231,555 | 11/1980 | Saito | 267/154 |
| 4,372,576 | 2/1983 | Inoue | 280/689 |
| 4,378,122 | 3/1983 | Ohno et al. | 280/689 |

*Primary Examiner*—Wayland Stallard
*Attorney, Agent, or Firm*—Frishauf, Holtz, Goodman & Woodward

[57] ABSTRACT

A hollow stabilizer manufactured from a material obtained by adding a minute amount (0.001–0.01% by weight) of boron to either a carbon steel tubing having a relatively low carbon concentration of 0.20–0.35% for mechanical and structural purposes or to a carbon steel tubing for general structural purposes. The carbon steel tubing thus provided is bent in a prescribed stabilizer form. The bent tubing is water quenched, for example, to a greater hardness than HRC 43. The water-hardened bent tubing is later tempered to a hardness HRC, ranging between 36 and 43, at a temperature of, for example, 300°–380° C. for a proper length of time. The hollow stabilizer obtained by the aforementioned heat-treating steps has a much greater fatigue strength.

15 Claims, 5 Drawing Figures

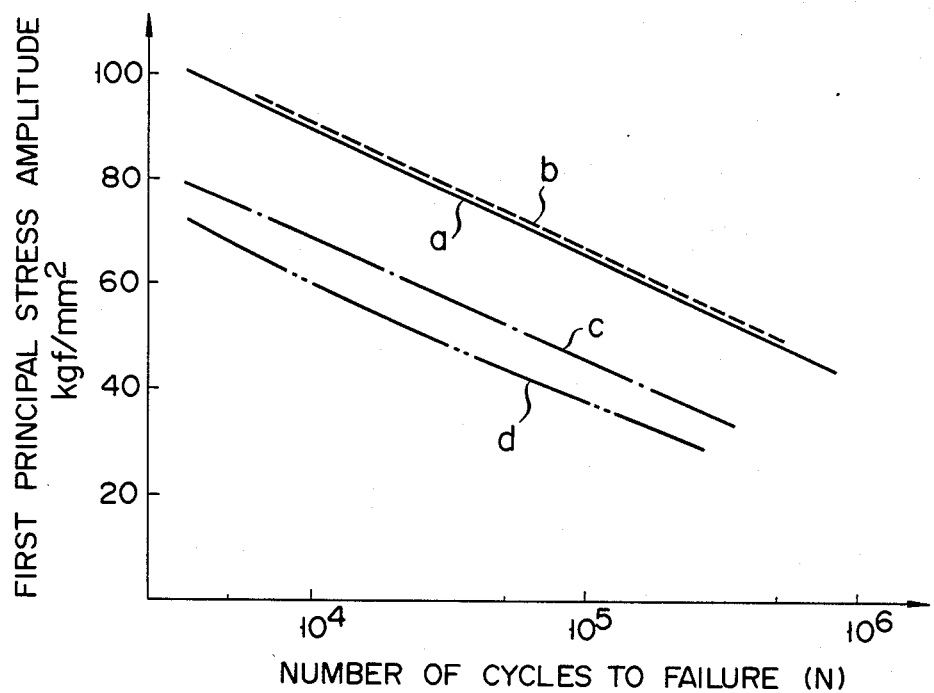

METHOD OF MANUFACTURING A HOLLOW STABILIZER

BACKGROUND OF THE INVENTION

This invention relates to a method of manufacturing a hollow stabilizer and more particularly to a hollow stabilizer formed of a steel tubing.

Heretofore, a vehicle stabilizer has generally been formed of a solid steel member. In recent years, however, studies have been conducted on the application of a steel tubing in order to reduce the weight of an automobile. A hollow stabilizer has already been put into practice in some quarters. To data, a stabilizer has been prepared from medium carbon steel containing about 0.4 to 0.7 weight % of carbon, or special steel containing a large amount of carbon such as spring steel. Therefore, the material of the conventional stabilizer is expensive. Moreover, the conventional stabilizer has to be subjected to oil quenching by applying costly quenching oil. Further, it has been necessary to provide means for preventing the scattering of oil mist or hot oil and effective fire prevention.

An example of hollow stabilizer is already set forth in the U.S. Pat. Nos. 4,372,576 and 4,378,122. In the case of the hollow stabilizers disclosed in these U.S. Patents and other known hollow stabilizers, it has been the common practice to apply special steel which contains high-carbon, such as spring steel. Moreover, oil quenching has generally been applied in heat-treatment of the conventional stabilizer, thereby presenting the aforementioned problems.

SUMMARY OF THE INVENTION

It is, accordingly the object of this invention, to provide an inexpensive hollow stabilizer which can be quenched without applying any oil and manufactured with sufficient mechanical strength for practical use.

The present inventors have conducted studies and experiments with respect to the material of the subject stabilizer and the heat-treating method thereof under the condition in which the stabilizer should have the required high quality. As a result, the inventors have discovered that the above-mentioned object can be attained if a tubing of low-carbon steel (having a carbon concentration of 0.2 to 0.35% by weight) with which boron has been mixed is heat-treated under the following conditions:

The tubing is bent in the form of an intended stabilizer.

Water quenching is later undertaken; and

Tempering is carried out to such extent that the hardness of the stabilizer falls within the range of $H_RC36$ to $H_RC43$.

This invention offers the advantage of manufacturing a hollow stabilizer from inexpensive and easily procurable low-carbon steel without applying expensive high-carbon special steel, such as spring steel. Since the hollow stabilizer embodying this invention is subjected to water quenching, quenching oil can be dispensed with, thereby offering the advantages that the cost of the hollow stabilizer is noticeably reduced, and it is unnecessary to consider measures for preventing the scattering of oil mist or hot oil particles. A further advantage of the hollow stabilizer of the invention is that since the stabilizer material has a relatively low-carbon concentration (0.2 to 0.35%), the heat affected zone in the welding treatment of the stabilizer retains a good quality.

BRIEF DESCRIPTION OF THE DRAWINGS

FIG. 4 shows variations in the hardness of a water-quenched stabilizer; and

FIG. 5 shows S-N diagrams illustrating the comparison of fatigue strength in various stabilizer materials.

DETAILED DESCRIPTION OF THE PREFERRED EMBODIMENTS

Figure 1:
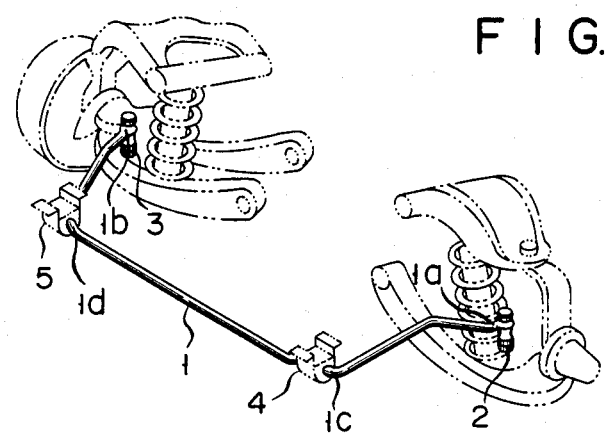
FIG. 1 is an outline of a wheel suspension fitted with a hollow stabilizer embodying this invention.

FIG. 1 shows the basical structure of an automobile suspension system. Reference numeral 1 denotes a hollow structure. Both end portions 1a and 1b of the hollow stabilizer 1 are connected to the corresponding wheel parts 2 and 3. The intermediate parts 1c and 1d of the hollow stabilizer 1 are supported by the parts (not shown) of an automobile chassis by means of the corresponding brackets 4 and 5.

Figure 2:
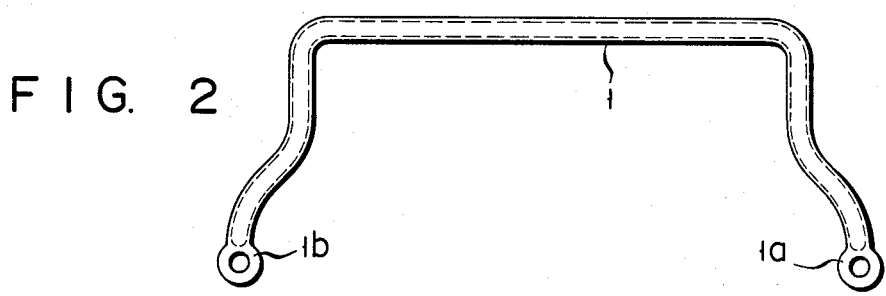
FIG. 2 is a plan view of the hollow stabilizer shown in FIG. 1.

FIG. 2 is a plan view of the above-mentioned hollow stabilizer 1. According to this invention, the hollow stabilizer 1 is prepared from material A or B given in Table 1 below. The stabilizer material A is formed by adding an extremely small amount of boron (0.001 to 0.008%) to a steel tubing moving a composition corresponding to STKM13$^A$. This term STKM13$^A$ denotes a carbon steel tubing for mechanical and structural purposes as defined in the item JIS-G3445 of the Japanese Industrial Standards (JIS). In other words, the above-mentioned stabilizer material A is formed by adding a minute amount of boron to a material having the same composition as the aforementioned STKM13$^A$.

The stabilizer material B is prepared by adding an extremely small amount of boron (0.001 to 0.008%) to a steel tubing having a composition corresponding to STKM15$^A$. This term STKM15$^A$ represents a carbon steel tubing for mechanical and structural purposes as specified in the item JIS-G3445 of the Japanese Industrial Standards. Namely, the stabilizer material B is formed by adding an extremely small amount of boron (0.001 to 0.008%) to a steel tubing having a composition corresponding to STKM15$^A$.

As shown in Table 1 below, the stabilizer material A has a lower carbon content than 0.25%. The stabilizer material B has a carbon content of 0.25 to 0.35%. Therefore, both stabilizer materials A and B may be regarded as belonging to the group of low carbon steel.

TABLE 1

| | Composition of Stabilizer Material (weight %) | |
|---|---|---|
| Component | Material A | Material B |
| C | less than 0.25 | 0.25–0.35 |
| Si | 0–0.35 | 0–0.35 |
| Mn | 0.30–0.90 | 0.30–1.00 |
| P | 0–0.040 | 0–0.040 |
| S | 0–0.040 | 0–0.040 |
| B | 0.001–0.008 | 0.001–0.008 |

According to the embodiment of this invention, one hollow stabilizer, having an outer diameter of 22 mm and a thickness of 2.6 mm, and another hollow stabilizer, having an outer diameter of 25 mm and a thickness of 3.0 mm, are prepared from the material A. Another group of said stabilizers are manufactured from the material B. Both stabilizers are fabricated through the below-mentioned steps. The manufacture of both stabilizers is carried out through the below-mentioned steps.

The workpiece of a steel tubing is bent in the form of a prescribed stabilizer. The work piece is heated to certain temperature for water quenching by resistance heat generated when current is introduced through the steel tubing. The heat treatment of the steel tubing may further be effected by application of high-frequency waves or a particular furnace.

To describe in greater detail, the resistance heating is carried out at a temperature of 900° to 1,100° C. for 20 to 30 seconds. In this case, it is preferred to apply said resistance heating at a lower temperature than 1,000° C. in order to prevent the excessive grain-growth in the metallurgical structure. Furnace heating should advisably be carried out at a temperature of 900° to 950° C. for about 10 minutes.

After the above-mentioned heating, the water quenching of the steel tubing stabilizer is effected with water kept at ordinary water temperature of 15°–25° C. or warm water at 40°–50° C. In each case the water has two conditions, one is the agitated condition and the other is the stationary condition. After the water quenching, the steel tubing indicated the Rockwell hardness $H_RC$ given in Table 2 below.

TABLE 2

| Size of stabilizer material | | Rockwell hardness of hollow stabilizer | | | |
|---|---|---|---|---|---|
| | | Ordinary temperature water | | Warm water | |
| | | Agitated | Stationary | Agitated | Stationary |
| 22ϕ × 2.6 t | $\overline{X}$ | 44.95 | 44.95 | 45.2 | 44.95 |
| | R | 4.1 | 2.5 | 1.3 | 3.0 |
| 25ϕ × 3.0 t | $\overline{X}$ | 45.6 | 45.9 | 45.6 | 45.6 |
| | R | 1.8 | 1.5 | 1.5 | 1.2 |

As seen from Table 2 above, the hardness of the water-quenched hollow stabilizer must be above $H_RC43$. The reason for this is that if the stabilizer has a lower hardness than $H_RC43$, the stabilizer does not have a sufficient toughness and durability, even when tempered to the range of $H_RC36$ to $H_RC43$: The upper limit of the water hardening depends on the chemical composition of a stabilizer steel tubing. In the case of a hollow stabilizer embodying this invention, the upper limit of said water quenching culminates at $H_RC50$. When, however, the stabilizer has a carbon content approximately 0.35%, the water quenching ensures the hardness $H_RC$ of 52 to 53.

Twelve samples were used in providing the data indicated in Table 2 above. The hardness of the stabilizer sample was determined at twelve equidistant circumferential points. In Table 2 above, the character $\overline{X}$ denotes the average hardness of twelve water quenched samples. The character R represents variations in a balance arrived at by subtracting a minimum hardness from a maximum hardness of each sample.

When tempered at a temperature of 300° to 380° C. for about 50 to 60 minutes after water quenching, the stabilizer sample has a Rockwell hardness HRC34–37. The present inventors have discovered that when tempered to ensure a higher hardness than $H_RC36$, the stabilizer displays a sufficient fatigue strength to withstand practical application.

Figure 3:
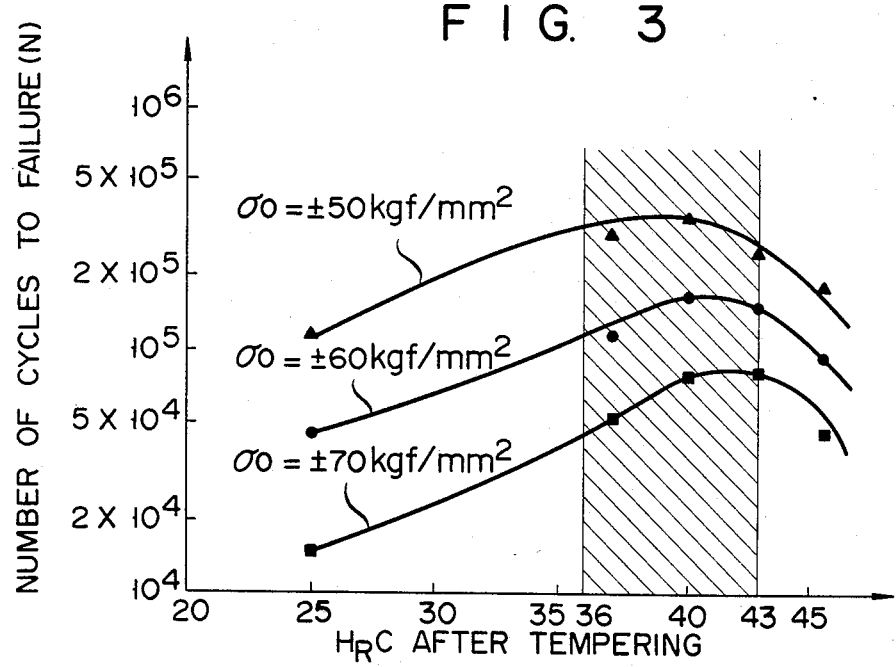
FIG. 3 graphically indicates the relationship between the hardness $H_RC$ of a tempered stabilizer and the fatigue strength thereof.

FIG. 3 shows the relationship between the hardness $H_RC$ of a tempered hollow-stabilizer sample manufactured by the above-mentioned method and the fatigue strength thereof. The fatigue test of the tempered stabilizer sample is conducted with the assumption that a designed stress, applied to the stabilizer, is generally chosen to be $\sigma_0 = \pm 50$, $\pm 60$, $\pm 70$ kgf/mm$^2$. If, under the condition of $\sigma_0 = \pm 60$ kgf/mm$^2$, the number of cycles to failure a stabilizer sample can be more than $10^5$ times, then such a stabilizer may be regarded as possessing a sufficient fatigue strength to withstand practical application.

FIG. 3 shows that a tempered stabilizer having a greater hardness than $H_RC36$, has a sufficient fatigue strength to withstand practical application. Particularly when having a tempered hardness approximating $H_RC40$, the stabilizer indicates an optimum fatigue strength.

A stabilizer having a greater hardness than $H_RC43$ is more susceptive to such defects as minute scars, unavoidably formed on the surface of the stabilizer, and resulting in a noticeable decline in the number of cycles to failure of the stabilizer. According to the present invention, therefore, the upper limit of the hardness $H_RC$ of a tempered stabilizer is set at 43.

For the reason given above, a hollow stabilizer embodying this invention, is tempered to such extent that the hardness of $H_RC$, stands at $H_RC36$ to 43, preferably $H_RC38$ to 42, and most preferably at the proximity of $H_RC40$.

FIG. 4 shows variations in the hardness $H_RC$, comparing boron-added stabilizer samples of this invention, prepared from the materials A and B and later water quenched, and the conventional boron-free samples, prepared from the STKM13$^A$ and STKM15$^A$ specified in JIS. As seen from FIG. 4, the boron-added stabilizer samples of the invention, prepared from the materials A and B and later water quenched, indicate for less variations in the hardness $H_RC$ than the conventional boron-free samples, prepared from the STKM13$^A$ and STKM15$^A$. Data given in FIG. 4 were obtained by determining the hardness $H_RC$ at four equidistant circumferential points of a steel tubing having an outer diameter 22 mm and a thickness of 2.6 mm.

In the S-N diagram of FIG. 5, curve a denotes the fatigue strength of a hollow stabilizer manufactured by a method embodying this invention. Curve b represents the fatigue strength of the conventional hollow stabilizer prepared from common spring steel (SUP9), containing, for example, manganese and chromium, and later subjected to oil quenching and tempering. Curve C shows the fatigue strength of a boron-free stabilizer prepared from the ordinary STKM15$^A$ and later subjected to water-quenching and tempering. Curve d indicates the fagitue strength of a boron-free sample prepared from the ordinary material STKM15$^A$, but not subjected to heat-treating.

The equivalent carbon (Ceq) of steel may be expressed, for example, as:

$$Ceq = C + \frac{1}{6} Mn + \frac{1}{24} Si + \frac{1}{5} Cr + \frac{1}{4} Mo$$

It has been experimentally confirmed that if, in this case, the Ceq is set at a smaller value than 0.5, the quality of the heat affected zone of the welded tubing can retain a good quality. Since Ceq can be defined within a range of 0.25 to 0.5, according to the embodiment of this invention, a steel tubing manufactured by welding can reliably have a good quality.

According to the aforementioned embodiment, a hollow stabilizer is manufactured from carbon steel tubing for the mechanical and structural purposes obtained by adding boron to a steel tubing having a carbon content corresponding to that of the STKM13$^A$ or STKM15$^A$. If, however, a carbon content chosen to be 0.2 to 0.35% is used, a hollow stabilizer, embodying this invention, may be manufactured from a material, obtained by adding a minute amount (0.001-0.01%) of boron to another carbon steel tubing for mechanical and structural purposes corresponding to, for example, STKM14$^A$ (containing less than 0.3% of C, less than 0.35% of Si, 0.30-1.00% of Mn, less than 0.04% of P and less than 0.04% of S) specified in JIS-G3445. Or a hollow stabilizer, embodying this invention, may be prepared from a material, obtained by adding a minute amount (0.001-0.01%) of boron to a carbon steel tubing for general structural purposes, for example, STK41 (containing less than 0.25% of C, less than 0.040% of P, and less than 0.04% of S) specified in JIS-G3444. It is also possible to manufacture the subject hollow stabilizer from a material obtained by adding a minute amount (0.001-0.01%) of boron to STK51 (containing less than 0.3% of C, less than 0.35% of Si, 0.3 to 1.00% of Mn, less than 0.04% of P and less than 0.04% of S).

What is claimed is:

1. A method of manufacturing a hollow stabilizer which comprises the step of:
    bending a steel tubing containing 0.2-0.35 weight % of carbon and a minute amount of boron into a prescribed form;
    heating said bent steel tubing;
    rapidly water quenching said heated bent steel tubing to harden said bent steel tubing; and
    tempering said water-quenched and hardened bent steel tubing to a hardness $H_RC$ ranging between 36 and 43.

2. The method, according to claim 1, wherein the tempered bent steel tubing has a hardness $H_RC$ ranging between 38 and 42.

3. The method, according to claim 1, wherein the tempered bent steel tubing has a hardness $H_RC$ approximating 40.

4. The method, according to claim 1, wherein the boron content of said hollow stabilizer is from 0.001 to 0.01%.

5. The method, according claim 1, wherein the water-quenched and hardened bent steel tubing has a hardness greater than $H_RC43$.

6. The method, according to claim 1, wherein in said heating step said bent steel tubing is resistance heated to a temperature of 900°-1,100° C. for 20-30 seconds.

7. The method, according to claim 6, wherein said resistance heating is carried out at a lower temperature than 1,000° C.

8. The method, according to claim 1, wherein in said heating step, said bent steel tubing is heated in a furnace at a temperature of 900°-950° C. for about 10 minutes.

9. The method, according to claim 1, wherein said tempering is at a temperature of 300°-380° C. for 50-60 minutes.

10. The method, according to claim 2, wherein the boron content of said hollow stabilizer is from 0.001 to 0.01% and wherein the water-quenched and hardened bent steel tubing has a hardness greater than $H_RC43$.

11. The method, according to claim 10, wherein in said heating step, said bent steel tubing is resistant heated to a temperature of 900°-1,000° C. for 20-30 seconds and wherein said tempering is at a temperature of 300°-380° C. for 50-60 minutes.

12. The method, according to claim 11, wherein the tempered bent steel tubing has a hardness $H_RC$ approximating 40.

13. The method, according to claim 10, wherein in said heating step, said bent steel tubing is heated in a furnace at a temperature of 900°-950° C. for about 10 minutes and wherein said tempering is at a temperature of 300°-380° C. for 50-60 minutes.

14. The method, according to claim 13, wherei nthe tempered bent steel tubing has a hardness $H_RC$ approximating 40.

15. The method, according to claim 1, wherein the boron content of said hollow stabilizer is from 0.001 to 0.008%.

* * * * *